United States Patent
Poisson et al.

(10) Patent No.: US 8,265,839 B2
(45) Date of Patent: Sep. 11, 2012

(54) METHOD FOR CONTROLLING AN AUTOMATIC TRANSMISSION OF A MOTOR VEHICLE IN THE BRAKING PHASE

(75) Inventors: Carine Poisson, Montlhery (FR); Eric Brun, Montigny-le-Bretonneux (FR)

(73) Assignee: Renault s.a.s., Boulogne-Billancourt (FR)

( * ) Notice: Subject to any disclaimer, the term of this patent is extended or adjusted under 35 U.S.C. 154(b) by 850 days.

(21) Appl. No.: 11/577,920

(22) PCT Filed: Oct. 21, 2005

(86) PCT No.: PCT/FR2005/050880
§ 371 (c)(1),
(2), (4) Date: Jan. 5, 2010

(87) PCT Pub. No.: WO2006/048566
PCT Pub. Date: May 11, 2006

(65) Prior Publication Data
US 2010/0106383 A1    Apr. 29, 2010

(30) Foreign Application Priority Data
Oct. 29, 2004    (FR) .................................... 04 11569

(51) Int. Cl.
*B60K 41/06* (2006.01)
*F16H 61/21* (2006.01)

(52) U.S. Cl. .............................. 701/60; 701/57; 477/120
(58) Field of Classification Search .................... 701/60, 701/57; 477/120, 901, 904
See application file for complete search history.

(56) References Cited

U.S. PATENT DOCUMENTS

| 5,555,170 | A | | 9/1996 | Nakashima |
| 6,003,396 | A | * | 12/1999 | Bellinger et al. ........... 74/336 R |
| 6,066,071 | A | * | 5/2000 | Janecke et al. ................... 477/78 |
| 8,062,179 | B2 | * | 11/2011 | Eriksson et al. .............. 477/107 |
| 2004/0038776 | A1 | * | 2/2004 | Kuhstrebe et al. ............... 477/77 |
| 2004/0097328 | A1 | * | 5/2004 | Makiyama et al. .............. 477/43 |

FOREIGN PATENT DOCUMENTS

| EP | 0 512 705 | 11/1992 |
| EP | 0 559 255 | 9/1993 |
| FR | 2 765 652 | 1/1999 |

* cited by examiner

*Primary Examiner* — Tan Q Nguyen
(74) *Attorney, Agent, or Firm* — Oblon, Spivak, McClelland, Maier & Neustadt, L.L.P.

(57) ABSTRACT

A method for controlling an automatic gearbox pertaining to a motor vehicle in a braking phase. According to the method, a gear ratio or speed value of the gearbox, requested on the basis of pre-established laws, is determined; and, on the basis of the value and parameters representative of the situation of the vehicle, a corrected gear ratio or speed value of the gearbox, able to trigger an anticipated downshifting of the automatic gearbox, is determined. The corrected gear ratio value of the gearbox is determined on the basis of an estimation of the desired primary speed for the automatic gearbox.

12 Claims, 2 Drawing Sheets

Figure 1:
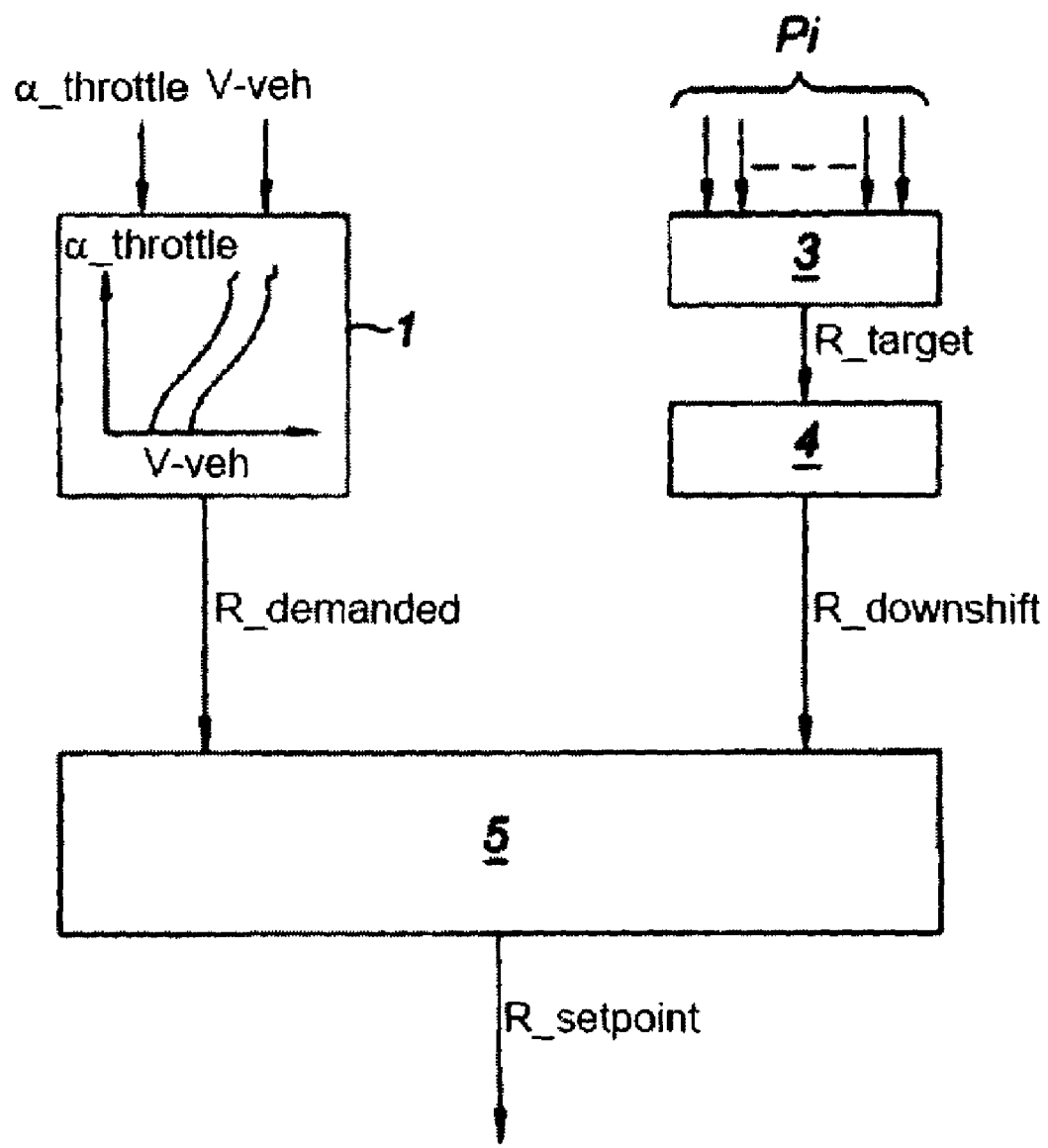

METHOD FOR CONTROLLING AN AUTOMATIC TRANSMISSION OF A MOTOR VEHICLE IN THE BRAKING PHASE

The present invention relates to a method for controlling an automatic transmission of a motor vehicle in the braking phase.

In the majority of known methods for controlling automatic transmissions having continuously variable ratio (CVT or "Continuous Variable Transmission") or multi-stage ratios (BVA or "Automatic Gearbox" or BVR "Robotized Gearbox"), changes of transmission ratios are decided as a function of the vehicle speed and of the engine load.

Most often, these decisions are made by means of pre-established rules; variograms for automatic transmissions with continuously variable ratio, and ratio-changing rules for automatic transmissions with multi-stage ratios.

These known methods for controlling automatic transmissions have disadvantages during braking phases, where downshifting of the transmission ratio is necessary (principle of the "engine brake"; it is pointed out here that "downshifting of the transmission ratio" denotes continuous or multi-stage reduction of the gear ratio).

In fact, regardless of the traveling conditions (downhill, level, uphill) and regardless of the operator's driving style, downshifts will take place at the same operating points in the mathematical relationship between vehicle speed and engine load, which situation is prejudicial from the viewpoints of both driving comfort and safety.

FR 2765652 discloses a method intended to overcome this disadvantage. The method taught by that document makes it possible to control an automatic transmission of a motor vehicle in the braking phase, and comprises the steps consisting of:
- determining a value of the transmission ratio from pre-established rules, and of
- determining, on the basis of this value and of parameters representative of the situation of the said vehicle, a corrected value of transmission ratio capable of inducing an early downshift of the said automatic transmission.

Although it permits obtaining better assistance from the engine brake during braking phases, this prior art method is not entirely satisfactory.

In fact, it uses in particular the current value of the turbine rpm of the automatic gearbox as parameter, and it compares this current value with a limit value that does not depend on the existing gear ratio.

As a result, the downshifting setpoints are not homogeneous over the ratios, thus detracting from driving comfort.

In fact, given the non-regular gear ranges of a gearbox (larger difference between certain ratios), the engine brake will not be the same over different downshifts (3→2 or 5→4, for example) even if they take place at the same starting rpm.

The objective of the present invention is to improve this prior art method.

This objective of the invention is achieved with a method for controlling an automatic transmission of a motor vehicle in the braking phase, of the type in which:
- a value of transmission ratio (or rpm) demanded on the basis of pre-established rules is determined,
- on the basis of this value and of parameters representative of the situation of the said vehicle, a corrected value of transmission ratio (or rpm) capable of inducing early downshifting of the said automatic transmission is determined, noteworthy in that the said corrected value is determined on the basis of an estimate of the primary rpm desired for the said automatic transmission.

By virtue of this method, it is possible to adapt the progress of downshifting to a target primary rpm which, taking the situation of the vehicle into consideration, seems to offer the maximum of driving comfort and safety.

In addition, the method according to the invention can be applied both to an automatic transmission with multi-stage ratios and to an automatic transmission with continuously variable ratio.

According to other optional characteristics of the method according to the invention:
- the said estimate is obtained on the basis of parameters chosen within the group comprising (non-exhaustive list):
  - an information item representative of the braking time,
  - the deceleration of the vehicle,
  - the primary rpm,
  - the primary rpm calculated on the lower ratios (valid only in the case of an automatic transmission with multi-stage ratios),
  - the gradient of the road,
  - an indicator representative of the driving style,
  - the weight of the vehicle,
  - the traction,
  - the transverse acceleration,
  - the temperature of the gearbox,
  - the temperature of the engine coolant,
- the said estimate is obtained by applying rules chosen within the group comprising the following rules (non-exhaustive list):
  - the more heavily the operator brakes, the more downshifting takes place at high rpms,
  - the steeper the downhill gradient, the earlier downshifting takes place,
  - the sportier the operator, the more downshifting takes place at high rpms,
  - the greater the vehicle load on a downhill gradient, the earlier downshifting takes place,
  - if traction is poor and the vehicle is cornering, downshifting does not take place,
  - if light braking is being applied and traction is poor, downshifting takes place at low rpms,
  - if heavy braking is being applied and traction is poor, downshifting does not take place,
  - the thresholds of the said rules are adapted to the situation of the said vehicle.

The present invention also relates to the application of a method according to the foregoing to a transmission with continuously variable ratio.

Optionally, in this application, the following strategy is applied at the end of the braking phase:
- when the accelerator is depressed, the rpm setpoint value applied to the said automatic transmission is made to converge toward the said rpm value demanded by the rules,
- if, during the said convergence, the situation calls for downshifting, the said corrected rpm value is re-applied to the said rpm setpoint value,
- if, during the said convergence, the foot is released from the accelerator, the said rpm setpoint value then is fixed at its most recent value.

The present invention also relates to an application of a method according to the foregoing to a transmission with multi-stage ratios.

According to optional characteristics of this application:

within a waiting period limited to a maximum delay time, the said corrected value is allowed to decrease by an amount corresponding to at least a double downshift, whereupon this double downshift is effectively authorized, the said waiting period is adapted to parameters chosen within the group comprising the current value of the transmission ratio, the selected set of gear-change rules and the deceleration of the vehicle, at the end of the braking phase, the following strategy is applied:

at the start of downshifting, a delay time is initialized, when the accelerator is depressed, the delay time is started, if, while the said delay time is running, the foot is released from the accelerator, the setpoint ratio value applied to the said automatic transmission then is fixed at its most recent value, as soon as the delay time has elapsed and the vehicle is not cornering, the said demanded ratio value is given to the said setpoint ratio value, if the vehicle is cornering, the setpoint ratio value is fixed until cornering has been completed.

The present invention also relates to an automatic transmission for a motor vehicle, noteworthy in that it is adapted for employing a method according to the foregoing.

The present invention also relates to a motor vehicle, noteworthy in that it incorporates an automatic transmission according to the foregoing.

Figure 2:
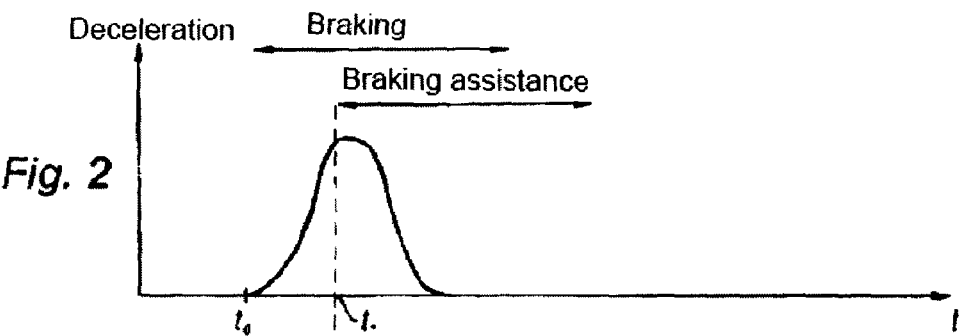
Figure 3A:
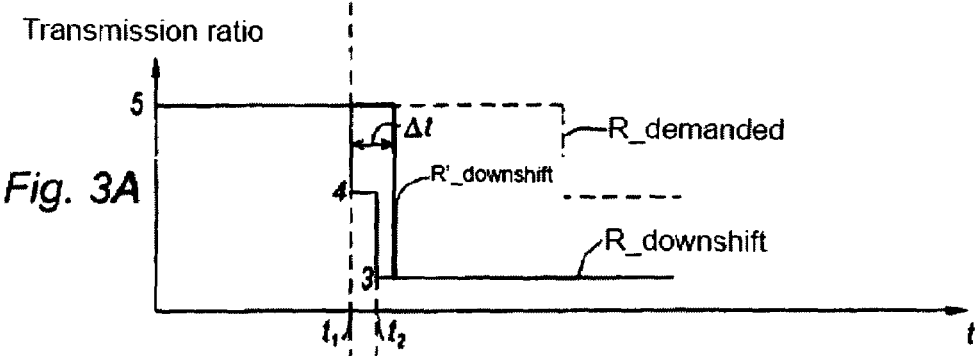
Figure 3B:
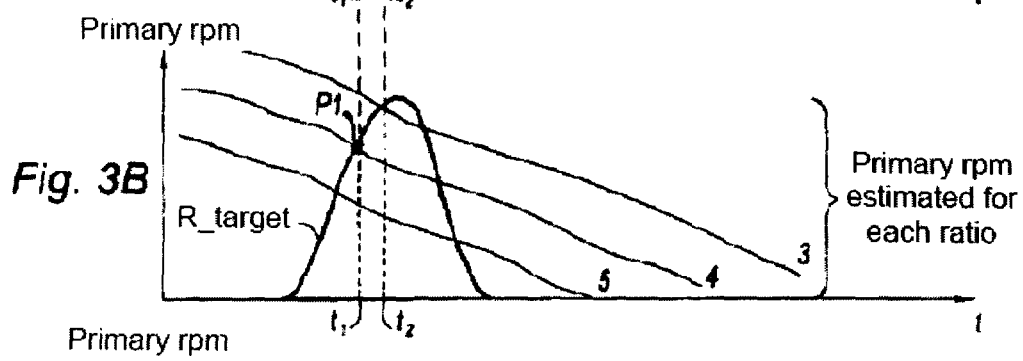
Figure 4:
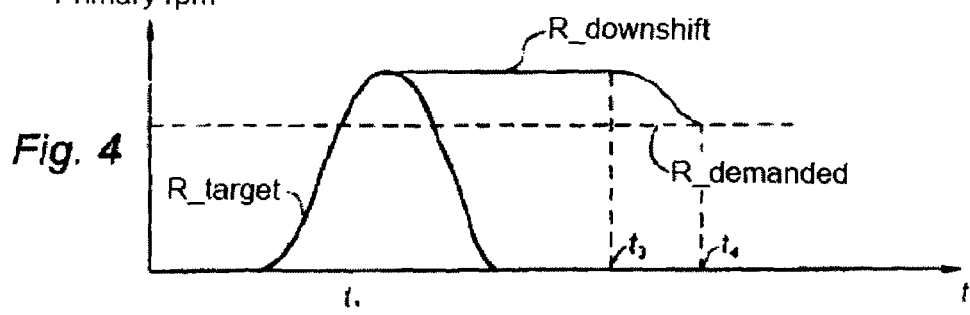

Other characteristics and advantages of the invention will become apparent upon reading the description hereinafter and upon examining the attached figures, wherein:

FIG. 1 schematically shows the main steps of the method according to the invention, FIG. 2 shows the deceleration of a vehicle in the braking phase, FIG. 3A shows the downshifts of gear ratios of this vehicle for the hypothesis of an automatic transmission with multi-stage ratios, FIG. 3B shows the estimate of the primary rpm to be attained in order to permit control of the downshifts shown in FIG. 3A, and FIG. 4 shows, on the same graph, the rpm variations of an automatic transmission with continuously variable ratio and the estimate of the primary rpm to be attained.

Hereinafter the expression "automatic transmission" will be used.

It must be understood that, in the absence of indication to the contrary, this expression covers both the case of an automatic transmission with multi-stage ratios and the case of a transmission with continuously variable ratio.

The expression "primary rpm" will also be used. This expression denotes the rpm of the primary shaft, or input rpm, of the automatic transmission.

The "situation" of the vehicle will also be mentioned. This term relates not only to the internal state of the vehicle (primary rpm, weight of the vehicle, transverse acceleration, temperature of the automatic transmission, temperature of the engine coolant, etc.) but also to its environment (gradient of the road, traction, etc.) and to the driving style for this vehicle.

The letter "R", which will be used with or without suffix, will signify "ratio" in the case of an automatic transmission with multi-stage ratios and "rpm" in the case of an automatic transmission with continuously variable ratio.

Referring now to FIG. 1, it is seen that, starting from one or more pre-established rules 1, there is traditionally determined a value R_demanded of the ratio (case of a transmission with multi-stage ratios) or of the rpm (case of a transmission with continuously variable ratio) demanded of the automatic transmission.

As is known in itself, the value R_demanded is determined in particular from a parameter $\alpha$_throttle representative of the load of the vehicle engine and a parameter V_veh representative of the speed of this vehicle.

Traditionally, $\alpha$_throttle actually represents the degree of opening of the motorized throttle valve in the engine (today, $\alpha$_throttle represents the pedal that is directly representative of the engine torque).

In the braking phase, or in other words when a brake pedal of the vehicle is depressed, an estimate of the primary rpm R_target desired for the automatic transmission is calculated in 3 from a plurality of parameters Pi.

By "desired primary rpm" there is understood the primary rpm which, taking the situation of the vehicle into account, offers the maximum driving comfort and safety.

By way of example, the parameters Pi may be chosen within the group comprising:

an information item representative of the braking time, the deceleration of the vehicle, the primary rpm, the primary rpm calculated on the lower ratios (valid only in the case of an automatic transmission with multi-stage ratios), the gradient of the road, an indicator representative of the driving style, the weight of the vehicle, the traction, the transverse acceleration, the temperature of the gearbox, the temperature of the engine coolant.

In this way, an estimate R_target of the desired primary rpm is obtained at the end of step 3.

In 4, there is deduced from the value R_target determined in this way a representative value R_downshift representing:

in the case of a transmission with multi-stage ratios, the gear ratio that must be approached, in the case of a transmission with continuously variable ratio, the rpm to be attained, in order to obtain the desired value R_target.

Processing of the parameters Pi in 3 in order to estimate the desired primary rpm R_target can be achieved with traditional logic or with fuzzy logic, or by resorting to any other means of interpreting the intent of the operator (neural networks, etc.).

By way of illustrative and non-limitative example, here are some rules that may govern the estimate of the desired primary rpm R_target:

the more heavily the operator brakes, the more downshifting takes place at high rpms, the steeper the downhill gradient, the earlier downshifting takes place, the sportier the operator, the more downshifting takes place at high rpms, the greater the vehicle load on a downhill gradient, the earlier downshifting takes place, if traction is poor and the vehicle is cornering, downshifting does not take place, if light braking is being applied and traction is poor, downshifting takes place at low rpms, if heavy braking is being applied and traction is poor, downshifting does not take place.

In 5, there is determined a value R_setpoint intended effectively to control the change of ratio (or of rpm) of the automatic transmission.

Outside the braking phase, the value R_setpoint is equal to the value R_demanded, and, in the braking phase, the value R_setpoint is equal to the value R_downshift.

The exit from braking phases can be managed in the following manner.

In the case of an automatic transmission with multi-stage ratios, a delay time is initialized as soon as R_setpoint imposes a downshift on the automatic transmission.

This delay time is a function of the vehicle speed and of the driving style.

As soon as the operator has pushed his foot back down on the accelerator, the delay time is started.

If, while the delay time is running, the operator releases his foot, then the delay time is fixed and R_setpoint is fixed at its most recent value.

As soon as the delay time has elapsed, and the vehicle is not cornering, R_setpoint assumes the value of R_demanded.

If the vehicle is cornering, R_setpoint is fixed and it is necessary to wait until cornering is completed before the value of R_demanded is given thereto.

In the case of a transmission with continuously variable ratio, as soon as the operator has pushed his foot back down on the accelerator, R_setpoint returns to R_demanded with a filter of ramp type or of first order, as a function of the vehicle speed and of the driving style.

If, while filtering is taking place, one of the conditions defined by the rules mentioned hereinabove becomes true once again, then the filtering is stopped and R_setpoint resumes the value R_downshift.

If, while filtering is taking place, the operator releases his foot, the filtering is stopped and R_setpoint is fixed at its most recent value.

It will be noted that, in the method just described and in the case of an automatic transmission with multi-stage ratios, the value R_downshift may under certain circumstances assume decreasing values at very closely spaced time intervals, which could cause a very rapid succession of downshifts.

Such a situation is obviously not desirable, because it substantially alters the driving comfort.

Instead, it is preferable in this kind of situation to directly give the automatic transmission a double or multiple downshift setpoint.

To achieve this, it is possible to provide for starting a delay time as soon as the value R_target orders a first downshift.

During this delay time, no final setpoint of ratio R_downshift is given: R_downshift is held at the value R_demanded determined by rules 1, and the minimal value assumed by the value R_target is stored in memory.

At the end of the delay time, R_downshift is given the said minimal value stored in memory.

In this way it is possible to execute only one double or multiple downshift rather than a series of very closely spaced successive downshifts.

The delay time depends on the current ratio of the automatic transmission, on rules 1 and on the deceleration of the vehicle.

The value of this delay time is re-updated constantly while it is running: the more the deceleration increases, the more the demand for downshifting is urgent, and therefore the shorter the delay time will be.

At the end of this delay time, when downshifting begins, another delay time is started, during which no new value R_downshift is calculated.

In fact the downshift in progress (single or multiple) causes excessive deceleration of the vehicle, which could be misinterpreted in step 3 as a new braking demand of the operator.

This second delay time depends on the selected set of rules, on the value R_downshift that has just been started and on the deceleration of the vehicle at the moment at which this value was started.

This second delay time does not have to be re-updated while it is running, because it depends on parameters that do not vary during that time.

At the end of this second delay time, the value R_target is calculated once again and, as soon as a new downshift demand is detected, the process described above can be restarted.

The mode of operation of the method according to the invention can be illustrated by referring to FIGS. 2 to 4.

In FIG. 2 the deceleration over time of a motor vehicle equipped with an automatic transmission employing the method according to the invention has been shown.

As is evident in this figure, the intensity of this deceleration increases from an instant t0 corresponding to the start of braking, reaches a maximum and then decreases.

"Braking assistance", or in other words the employment of the downshifting process, begins at an instant t1 subsequent to the instant t0 and slightly before the instant at which the deceleration reaches its maximum.

Reference now is made to FIGS. 3A and 3B, which relate to the case of an automatic transmission with multi-stage ratios.

It is seen that, before instant t1, at which it is supposed that the vehicle is traveling in $5^{th}$ gear, the values R_demanded and R_downshift are identical.

As can be seen in FIG. 3B, this instant t1 corresponds to the situation of a point P1 of the curve of the estimate of the desired primary rpm R_target, established on the basis of calculations performed in step 3 (see FIG. 1).

It is seen in FIG. 3B that it is the fourth gear ratio which will make it possible best to approach the desired primary rpm.

On the basis of this information, it is known that, at the instant t1, the value R_downshift must be such that it imposes a downshift from the fifth to the fourth gear ratio.

At the instant t2 subsequent to t1, there is seen in FIG. 3A a downshift from the fourth to the third gear ratio, imposed by the value R_downshift according to the same principle as that just described for the downshift from the fifth to the fourth gear ratio.

It can be seen in FIG. 3A that the value R_downshift dropped from the fifth to the fourth ratio much sooner than the value R_demanded, thus very explicitly illustrating the merit of the invention: the downshift takes place during the braking phase and not after, thus making it possible to derive the full benefit of the engine brake and therefore to achieve much more efficient braking.

It will also be noted in FIG. 3A that a variant for the value R_downshift, denoted by R'_downshift, has been shown.

In the preceding case, R_downshift=R_target, and in this variant R_downshift remains identical and R'_downshift is R_target.

This variant corresponds to the case in which there is envisioned a delay time making it possible to replace several closely spaced successive downshifts by a single downshift, according to the principles explained above.

It is noted that the value R'_downshift retains the value of R_demanded for a duration $\Delta t > t2-t1$, instead of assuming a value corresponding to the fourth ratio starting from instant t1.

At the end of this duration Δt, the value R'_downshift changes directly from a value corresponding to the fifth ratio to a value corresponding to the third ratio, which effectively makes it possible to replace a double downshift by a single downshift in the case in question.

Reference now is made to FIG. 4 in which the progress of the method according to the invention in the case of an automatic transmission with continuously variable ratio has been shown.

It is pointed out here that this FIG. 4 should be read in parallel with FIG. 2, that is without regard to FIGS. 3A and 3B.

As is apparent in this figure, the value R_downshift is equal to the value R_target as long as the latter is increasing, then the value R_downshift retains the maximum value attained by R_target until an instant t3, whereupon it decreases and ultimately returns to the value R_demanded at an instant t4.

As may be understood in the light of the foregoing, the method according to the invention makes it possible to adapt the progress of downshifting of the automatic transmission to a target primary rpm which, taking the situation of the vehicle into account, seems to offer the maximum of driving comfort and safety.

In addition, the method according to the invention may be applied both to an automatic transmission with multi-stage ratios and to an automatic transmission with continuously variable ratio.

Moreover, the method according to the invention makes it possible optimally to manage the multiple downshifts in the case of an automatic transmission with multi-stage ratios.

Furthermore, it will be noted that the method according to the invention takes into account the environment of the vehicle (uphill, level, downhill, cornering, etc.), the operator's style, the vehicle load, as well as the traction on the ground.

Of course, the present invention is not limited to the described and represented embodiment, provided for illustrative and non-limitative purposes.

The invention claimed is:

1. A method for controlling an automatic transmission of a motor vehicle in a braking phase, comprising:
   determining a value of transmission ratio or rpm demanded based on pre-established rules;
   determining, on the basis of a value and of parameters representative of a situation of the vehicle, a corrected value of transmission ratio or rpm capable of inducing early downshifting of the automatic transmission;
   wherein the corrected value is determined on the basis of an estimate of the primary rpm desired for the automatic transmission.

2. A method according to claim 1, wherein the estimate is obtained on the basis of parameters chosen within the group comprising:
   an information item representative of the braking time,
   deceleration of the vehicle,
   primary rpm,
   primary rpm calculated on lower ratios, valid in a case of an automatic transmission with multi-stage ratios,
   gradient of the road,
   an indicator representative of driving style,
   weight of the vehicle,
   traction,
   transverse acceleration,
   temperature of a gearbox,
   temperature of engine coolant.

3. A method according to claim 2, wherein the estimate is obtained by applying rules chosen within the group comprising the following rules:
   the more heavily an operator brakes, the more downshifting takes place at high rpms,
   the steeper a downhill gradient, the earlier downshifting takes place,
   the sportier the operator, the more downshifting takes place at high rpms,
   the greater a vehicle load on a downhill gradient, the earlier downshifting takes place,
   if traction is poor and the vehicle is cornering, downshifting does not take place,
   if light braking is being applied and traction is poor, downshifting takes place at low rpms,
   if heavy braking is being applied and traction is poor, downshifting does not take place.

4. A method according to claim 3, wherein thresholds of the rules are adapted to a situation of the vehicle.

5. Application of a method according to claim 1 to a transmission with a continuously variable ratio.

6. Application according to claim 5, wherein the following strategy is applied at an end of the braking phase:
   when the accelerator is depressed, a rpm setpoint value applied to the automatic transmission is made to converge toward the rpm value demanded by the rules,
   if, during the convergence, the situation calls for downshifting, the corrected rpm value is re-applied to the rpm setpoint value,
   if, during the convergence, a foot is released from an accelerator, the rpm setpoint value is fixed at its most recent value.

7. Application of a method according to claim 1 to a transmission with multi-stage ratios.

8. Application according to claim 7, wherein, within a waiting period limited to a maximum delay time, the corrected value is allowed to decrease by an amount corresponding to at least a double downshift, whereupon the double downshift is effectively authorized.

9. Application according to claim 8, wherein the waiting period is adapted to parameters chosen within the group comprising: current value of the transmission ratio, selected set of gear-change rules, and deceleration of the vehicle.

10. Application according to claim 7, wherein, at the end of the braking phase, the following strategy is applied:
    at the start of downshifting, a delay time is initialized,
    when the accelerator is depressed, the delay time is started,
    if, while the delay time is running, a foot is released from an accelerator, a setpoint ratio value applied to the automatic transmission is fixed at its most recent value,
    as soon as a delay time has elapsed and the vehicle is not cornering, a demanded ratio value is given to the setpoint ratio value,
    if the vehicle is cornering, the setpoint ratio value is fixed until cornering has been completed.

11. An automatic transmission for a motor vehicle, adapted for employing a method according to claim 1.

12. A motor vehicle performing a method for controlling an automatic transmission according to claim 1.

* * * * *